Nov. 8, 1938.  H. NILSEN  2,135,831
CLOTHESLINE REEL
Filed Feb. 11, 1936
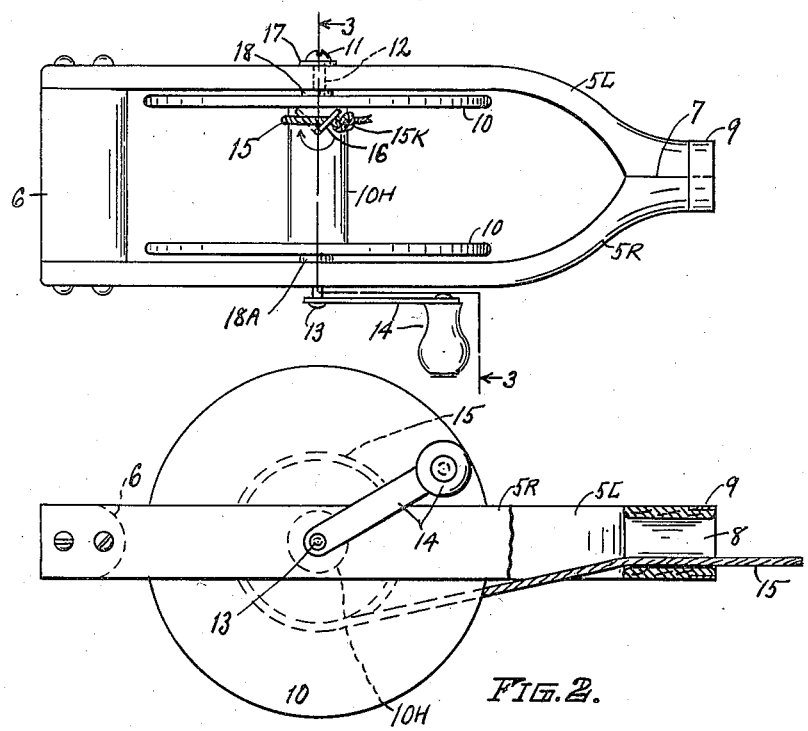
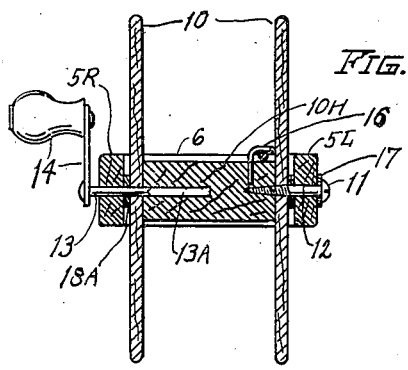
INVENTOR:
Helge Nilsen
BY David E. Carlsen
ATTORNEY.

Patented Nov. 8, 1938

2,135,831

UNITED STATES PATENT OFFICE 2,135,831

CLOTHESLINE REEL

Helge Nilsen, St. Paul, Minn.

Application February 11, 1936, Serial No. 63,329

1 Claim. (Cl. 242—100)

My invention relates to reel devices of the type designed primarily for clotheslines.

The main object is to provide a simple, highly efficient and inexpensive clothesline reel involving certain advantageous features of construction and use hereinafter fully set forth and illustrated in the accompanying drawing, in which—

Fig. 1 is a top or plan view of my improved clothesline reel showing a rope end in secured position on the drum hub. Fig. 2 is a partly sectional side elevation of Fig. 1 showing a length of rope from the drum passing thence outwardly through the outlet of the device. Fig. 3 is a transverse sectional elevation of the device, about as on line 3—3 in Fig. 1.

Referring to the drawing by reference numerals, like parts are identified by the same numerals throughout the several views.

My device includes a main frame made of two counterpart members, left and right, designated 5L and 5R respectively and a rear integral cross member 6 connecting and spacing the rear end parts of the counterpart members. 5R and 5L comprise a pair of parallel bars extending forward a predetermined distance, thence curved toward each other to a common central line 7 at which they form together a cylindrical outlet 8 rigidly connected and held together by a metal ferrule 9, said outlet being longitudinal of and concentric of the main frame.

Between the parallel bars of the frame I mount a reel or drum comprising the flanges 10 and integral hub 10H. This drum is rotatable on a two part axis of which one part may be a common wood screw 11 rotatable in the bore 12 of the frame member 5L and the other part is a stub shaft 13 extending outwardly through the frame member 5R.

The inner part of the stub shaft may be polygonal as at 13A in Fig. 3 to frictionally and rigidly engage in the hub. Exteriorly of the main frame the shaft is provided with a crank 14.

15 designates a clothesline with a knot 15K on the drum end of it (Fig. 1) said latter end removably retained on and at one end of the hub 10H by a retainer comprising an L-shaped wire 16 one shank of which is rotatably retained radially in the hub as best shown in Fig. 3. The other integral shank is parallel to and over the hub face enough to retain the line 15 loosely therebetween. The latter shank of the retainer is of such length that its free end bears against the inner side of the adjacent drum flange when the shank is in angular position. In Fig. 1 the knot 15K is forward of member 16 and it will be readily seen that when tension is effected on the clothesline 15 by clock-wise rotation of the crank 14 the knot 15K will be drawn up and bear rearwardly against the wire member 16 and the rope is thus retained on the hub but is easily removable. For left handed persons or when the line is to be coiled on the hub in the opposite direction the rope 15 and its knot 15K are first placed opposite to the position shown in Fig. 1, member 16 being swung around to the dotted line position and the knot being rearward of the retainer 16. This line holding device is extremely simple and very efficient.

In the use of the device and assuming that one rope end is extending from the outlet end of the device and is fixed on a clothesline pole or the cross-arm thereof, the operator merely holds the device with the frame in about a horizontal plane, walks to the other pole or next rope engaging device, allowing the line to unroll from the drum and passing out through the outlet 8 as far as is necessary to permit fastening of the line to the next rope engaging means.

There may be any amount of desired friction in the reel axis by merely adjusting the screw 11, it being understood that it is preferred to have spacing washers 17—18 of which 17 is under the head of the screw and the other between the drum and the main frame. 18A is a corresponding spacer washer at the opposite side of the drum, on the shaft and between the drum and the adjacent frame bar.

When it is desired to reel in a clothesline the operator merely disconnects the line from the post or cross-arm nearest the reel-device, then holds the device with the transverse end against the body and holding the other end in direction of the next clothesline fastening, manipulating the crank 14 with one hand to wind the line on the drum while walking forward, his other hand preferably grasping over the tapered forward end of the device and holding the frame in longitudinal alinement with the direction of the line. For example, the operator can wind up the line by using his right hand to turn the crank and simultaneously uses his left hand to rigidly hold and direct the device. Obviously the device can be turned over to bring the crank on the left side the crank being then turned by the left hand and the device is held with the right hand. This changes the direction of coils on the hub but my reversible line end holding means takes care of this condition.

The bore 8 is of sufficient size to allow the rope 15 to move freely through and even to permit passage of any knots there may be.

Modifications may be made within the scope of the following claim and the foregoing specification, without departing from the scope and spirit of the invention.

I claim:

In a clothesline reel device comprising an elongated frame, a rear transverse bar comprising part of said frame, two parallel side bars extending forward integrally from said rear bar and thence toward each other and terminating in a common front end of the frame forming a tubular longitudinally bored outlet central of the frame, a drum rotatably mounted between the parallel bars with its hub in common plane with said outlet; and means at one end part of said hub at the inner face of one end flange for removably retaining a knotted end of a clothesline or the like, selectively, for clockwise or counter clockwise winding of said line on the hub, a crank for said drum exteriorly of one of said parallel bars, said line retaining means comprising an L-shaped wire member with one arm rotatably retained radially in the hub of the reel and its other arm in parallel relation to the face of said hub and of a length to contact the inner face of the adjacent drum flange while in an angular position relative to the said flange and at either side of the center line of the hub, selectively, for the purpose set forth.

HELGE NILSEN.